(No Model.)
J. G. McAULEY.
CAR WHEEL.
No. 307,482. Patented Nov. 4, 1884.
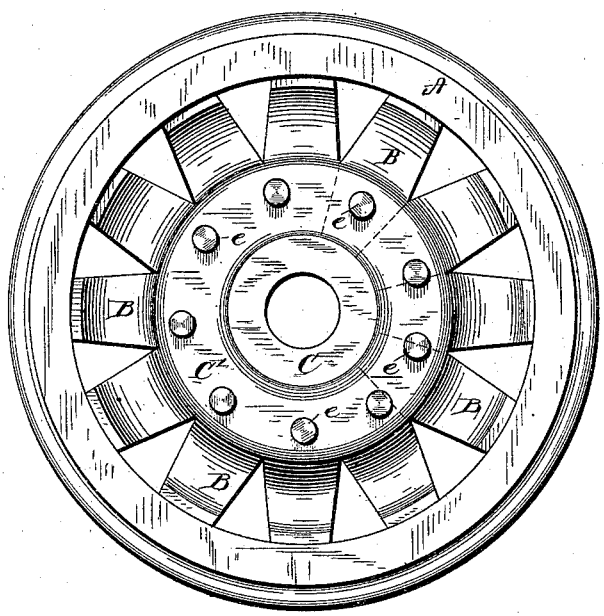
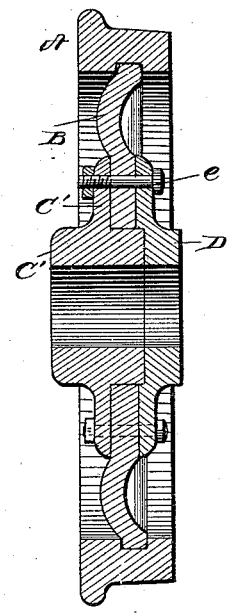
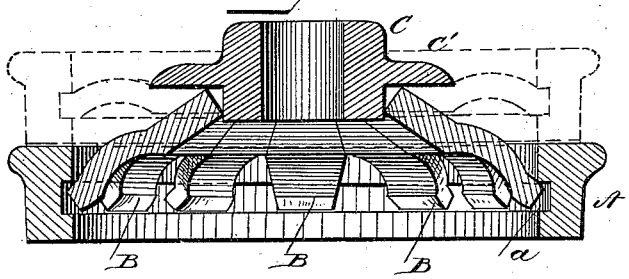
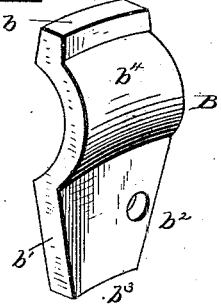
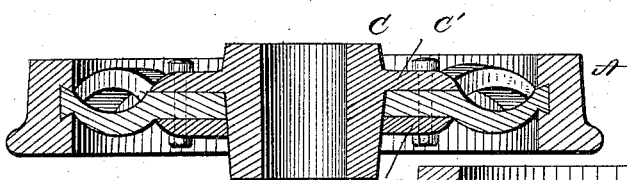
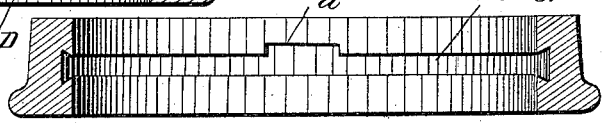
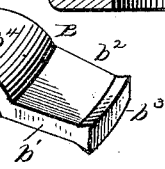
WITNESSES
F. L. Durand
Rex Smith
INVENTOR
John G. McAuley
by A. M. Smith
Attorney

UNITED STATES PATENT OFFICE.

JOHN G. McAULEY, OF NORTH ADAMS, MASSACHUSETTS.

CAR-WHEEL.

SPECIFICATION forming part of Letters Patent No. 307,482, dated November 4, 1884.

Application filed March 26, 1884. (No model.)

*To all whom it may concern:*

Be it known that I, JOHN G. MCAULEY, of North Adams, county of Berkshire, and State of Massachusetts, have invented a new and useful Improvement in Car-Wheels, of which the following is a full, clear, and exact description, reference being had to the accompanying drawings, making part of this specification.

My invention relates to a novel construction of car-wheels, whereby elasticity in the wheel itself is secured, and variations in the diameter or length of the rim or tire, due to variations in the temperature thereof, are compensated for.

It consists in the combination, in a car-wheel, of an elastic steel rim or tire having a continuous annular groove on its inner face, a flanged hub, and interposed connecting spring-steel spokes applied to said rim and hub under pressure in such manner as to spring or deflect the spokes in the act of forcing them to place, thereby adapting them to give an elastic support to the elastic rim, and at the same time to compensate for any variations in diameter of such rim, due to expansion or contraction from the action of heat and cold thereon.

It further consists in a novel arrangement of the spokes, for securing a channel for a current of air between the alternate spokes, and in the manner of securing the spokes to the hub, all as hereinafter described.

In the accompanying drawings, Figure 1 is a side or face view of a car-wheel embracing my improvement. Fig. 2 represents a vertical transverse section through the same. Fig. 3 is a similar section showing in full lines the manner of arranging the hub and spokes relative to the rim prior to forcing the parts into the working relation, indicated by the dotted lines; and Fig. 4 is a perspective view of one of the spokes detached. Fig. 5 is a sectional view showing a modification in the form of the hub, of the groove in the rim, and of the ends of the spokes entering said groove; Fig. 6, a section through the rim, and Fig. 7 a perspective view of one of the spokes of Fig. 5 detached.

A represents the annular rim or tire, having the usual external flange, and provided on its inner face with a continuous groove, $a$, the opposite sides or walls of which, by preference, are made vertical and parallel, as shown in Figs. 2 and 3; but they may be made to diverge as they approach the bottom wall of the groove, thereby giving to said groove a dovetail form, (shown in Figs. 5 and 6,) hereinafter referred to. The tire or rim A is by preference made of crucible-steel, that being the best quality of steel produced, and therefore particularly adapted to this use.

The spokes (indicated at B) are made of flat bars of steel or other suitable metal, preferably of Bessemer steel, which experiment has demonstrated as uniting the highest degree of crushing force with the desired amount of tensile strength and elasticity. These bars are cut of the required length, and their outer ends, $b$, are turned or otherwise formed each in the arc of a circle matching the bottom of the groove $a$ in the rim or tire. The inner ends of the spokes or bars or made tapering, the sides $b'$ $b^2$ converging in lines radial to the center of hub C, and the extreme inner ends, $b^3$, are made concave to fit said hub. These bars are then bent laterally near their outer ends, as indicated at $b^4$, by being placed in a die or former, or in other suitable manner, whereby the bend or curve is made uniform. The hub is provided with a peripheral flange, $C'$, and the curve $b^4$, when the spokes are in place, extends between the outer edge of said flange and the inner face of the rim or tire, as shown. With the rim, spokes, and hub thus formed, the tire is placed upon a suitable bed or table, and the outer ends of the spokes being placed in the groove therein, the tapering inner ends of said spokes are raised and assembled or brought together in a radial series within the rim, assuming the position or relation as indicated in Fig. 3. The hub is now inserted within the central opening formed by the concave inner ends of the spokes, and is forced downward or inward by hydraulic or other pressure sufficient to carry the spokes with it and to firmly seat them in the groove in the tire, and also to spring each spoke somewhat in, or give additional deflection to its curved portion $b^4$, thereby causing it not only to firmly grasp the tire, but adapting it to compensate for any elongation, and consequent increase in diameter of the tire, due to the heating of the same by the friction of the brake-shoe, or from other cause. A ring, D, is now placed on the end of the hub against the ends of the spokes, holes are drilled through the flange of the hub, the spokes, and ring at regular intervals, rivets e are inserted, and the latter are headed by hydraulic pressure, after which the hub is bored or reamed out to fit the axle, and the wheel is complete. The ring D may be made either in the form of a flanged extension of the hub, as shown in Fig. 2, or it may be simply a ring snugly fitting over the end of the hub, as shown in Fig. 5, as preferred.

In the modification shown in Figs. 5, 6, and 7 the groove in the tire, and the end of the spoke fitting therein, are made with diverging sides, or in dovetail form, and a notch or recess, $a'$, is cut at one side of the groove to permit the insertion of the ends of the spokes, which are then slipped around in the groove until all are in place, the last two inserted standing at the opposite ends of the notch $a'$. As in this construction the inner ends would be brought into, or nearly into, the same plane with the outer ends for firmly seating and springing or further deflecting their curved portions $b^4$, the hub C is made tapering, as shown, and, being forced into place by hydraulic pressure, the spokes are firmly seated and the required additional spring or curvature given, as explained. These spokes are ordinarily set with the concavity of the bent portions all facing the same way; but it may be found desirable to set them facing alternately in opposite directions, as indicated in Fig. 5, thereby forming a channel for a current of air between them, which would in a measure serve to prevent heating. If desired, after the wheel is formed, as described, the outer edges of the walls of the groove $a$ may be beaten or battered inward against the sides of the spokes for the purpose of more firmly holding the latter; but ordinarily this will be found unnecessary, as the great pressure exerted in applying the spokes, and which is necessary in order to spring or deflect them, as explained, not only serves to seat and cause them to firmly grasp the tire, but it serves also to store up in the spokes an elastic or expansive force sufficient to compensate for any expansion of the rim or tire. It will be apparent that it will not be necessary to curve the spokes prior to applying them, as the act of applying them will spring or curve them; but it is preferred to curve them slightly and uniformly before applying them, so as to give uniformity of appearance to them after they are applied, as otherwise they would be liable to spring irregularly in opposite directions.

Having now described my invention, I claim as new—

1. The combination, in a car-wheel, of the steel rim or tire having a continuous groove formed in its inner face, the flanged hub, and the interposed radial spokes made of greater length than the distance between the surfaces against which their ends abut, said spokes being deflected or bent laterally in substantially U shape between the hub and rim by being forced to their seats on said hub and rim under pressure, substantially as and for the purpose described.

2. The combination, in a car-wheel, of the steel rim or tire provided in its inner face with a continuous groove, a flanged metal hub, radial spring-spokes having their ends formed to fit the bottom of the groove in the tire and the surface of the hub, and curved or deflected laterally between the flange of the hub and tire, said spokes being made of greater length than the distance between the surfaces against which their ends abut, and the retaining ring or collar for securing the inner ends of the spokes between it and the flange on the hub, all applied and operating substantially as described.

3. The combination, in a car-wheel, of the continuously-grooved tire, the flanged hub, and a single series of elastic spokes curved or deflected laterally between the flange of the hub and the tire, and secured thereto, with the concave sides of the curved portions set facing alternately the opposite sides of the wheel, substantially as described.

4. The rim or tire provided with the continuous groove in its inner face, said groove being made dovetail in form, or with divergent side walls, and one of said walls notched or recessed to permit the insertion and removal of the spokes, in combination with the flanged hub, and with radial spokes, the outer ends of which are formed to match the dovetail form of the groove, substantially as described.

In testimony whereof I have hereunto set my hand this 15th day of February, A. D. 1884.

JOHN G. McAULEY.

Witnesses:
WM. H. PRITCHARD,
WIN. W. RICHMOND.